United States Patent [19]

Marty

[11] Patent Number: 5,772,359
[45] Date of Patent: Jun. 30, 1998

[54] SELF-PROPELLED PAVEMENT MARKING TAPE APPLICATOR

[75] Inventor: John L. Marty, White Bear Lake, Minn.

[73] Assignee: Minnesota Mining and Manufacturing Company, St. Paul, Minn.

[21] Appl. No.: 704,196

[22] Filed: Aug. 28, 1996

Related U.S. Application Data

[60] Provisional application No. 60/003,061 Aug. 31, 1995.

[51] Int. Cl.$^6$ .................................................... E01C 23/16
[52] U.S. Cl. ............................ 404/94; 474/133; 156/577
[58] Field of Search ............................... 404/93, 94, 108; 474/101, 133; 156/574, 577, 579

[56] References Cited

U.S. PATENT DOCUMENTS

| | | | |
|---|---|---|---|
| 2,367,466 | 1/1945 | Loy | 474/133 X |
| 2,540,894 | 2/1951 | Krause | 474/133 X |
| 3,007,838 | 11/1961 | Eigenmann | 156/526 |
| 3,279,336 | 10/1966 | Eaton et al. | 94/44 |
| 3,393,114 | 7/1968 | Jorgensen | 156/523 |
| 3,393,615 | 7/1968 | Micheln | 94/39 |
| 3,551,251 | 12/1970 | Sato et al. | 156/384 |
| 3,623,378 | 11/1971 | Stanford | 474/133 X |
| 3,864,052 | 2/1975 | Blomberg | 404/94 |
| 3,871,940 | 3/1975 | Antonioni | 156/353 |
| 3,874,801 | 4/1975 | White | 401/2 |
| 3,886,011 | 5/1975 | Eigenmann | 156/71 |
| 4,030,958 | 6/1977 | Stenemann | 156/350 |
| 4,224,996 | 9/1980 | Dobberpuhl | 474/133 X |
| 4,242,173 | 12/1980 | Stenemann | 156/523 |
| 4,313,780 | 2/1982 | Ford, Jr. | 404/94 X |
| 4,623,280 | 11/1986 | Stenemann | 404/94 |
| 4,824,516 | 4/1989 | Isihara et al. | 404/94 X |
| 4,923,559 | 5/1990 | Kennedy et al. | 404/94 X |
| 4,974,990 | 12/1990 | Anderson et al. | 404/94 |
| 5,059,061 | 10/1991 | Stenemann et al. | 404/72 |
| 5,125,589 | 6/1992 | Manusch | 156/577 X |

FOREIGN PATENT DOCUMENTS

| | | | |
|---|---|---|---|
| 0 507 714 | 7/1992 | European Pat. Off. | E01C 23/16 |

OTHER PUBLICATIONS

Catalog page –"Material Handling –Lane Marker/Tape Applicator and Reflective Warning Tape"; Wholesale Prices –Grainger; p. 1794.

Catalog page –"Safety Marking Tapes"; Master–Carr; p. 875.

Information Folder 1000 –"Scotchliner" Brand Manual Highway Tape Applicator; 3M; Apr., 1983; 1 page.

Page entitled "D. Scotchliner Roller Tamper Cart (RTC–2)"; p. 59.

Page entitled "Jungle Wheels™"; Jungle Jim's Accessory Products, Inc., one page.

U.S. Trademark "Scotch–Lane", Principal Register No. 826, 285, Registered Mar. 28, 1967 (one page).

Also submitted are various 3M documents related to the application of pavement marking tape. Included are documents believed to be 3M technical notebook pages including photographs and descriptions of various marking tape applicators and tamping apparatuses. It is not known whether the apparatuses described were sold or otherwise publicly known, nor is it known whether the documents submitted or the apparatuses described and shown constitute prior art. Should the Examiner require additional information regarding these documents, the Examiner is requested to contact Applicants' undersigned representative, or so indicate in an Office Action, and a further investigation will be conducted. (10 pages)

*Primary Examiner*—James Lisehora
*Attorney, Agent, or Firm*—Peter L. Olson

[57] ABSTRACT

A self-propelled pavement marking tape applicator. A slip-clutch assembly allows the operator to accurately control power transferred from the engine to the drive wheel(s) of the marking tape applicator. One-way clutch bearings provide differential action to the drive wheels when negotiating turns by allowing the wheel on the outside of the turning radius to rotate at a faster rate than the wheel on the inside of the turn. The differential action provided by the one-way clutch bearings also prevents the wheels from dragging on the pavement surface and permit the operator to manually push the marking tape applicator faster than it is being driven by the engine.

10 Claims, 4 Drawing Sheets

SELF-PROPELLED PAVEMENT MARKING TAPE APPLICATOR

This application claims priority to U.S. Provisional patent application Ser. No. 60/003,061, filed Aug. 31, 1995.

FIELD OF THE INVENTION

The present invention is directed to a self-propelled pavement marking tape applicator, and in particular, to a drive mechanism for a pavement marking tape applicator that permits accurate application of a pavement marking tape with minimum risk of damage to the tape.

BACKGROUND OF THE INVENTION

Pavement marking tape can be applied by a two-wheeled, push-type mechanical device, such as for example the device disclosed in U.S. Pat. No. 4,242,173 issued to Stenemann Dec. 30, 1980. The Stenemann device is designed to apply permanent pavement marking tape pre-coated with a pressure sensitive adhesive during and immediately following asphalt resurfacing operations or temporary marking tape in construction zones.

Pavement marking tape is generally available in rolls of 100 to 300 yards in length. However, these rolls weigh approximately 32 kg (70 lbs.) and a pavement marking device such as the one disclosed in Stenemann weighs approximately 113 kg (250 lbs). If two rolls of pavement marking tape are mounted on a pavement marking device, the total weight of the system may exceed 175 kg (383 lbs). Consequently, a fair amount of physical effort is required to propel these types of devices, especially up hills. In some circumstances, a second operator may be required to assist the primary operator, increasing the cost of applying the pavement marking tape. Finally, the effort necessary to propel these type of devices can detract from the operator's ability to accurately apply the pavement marking tape. For example, when intermittent segments of pavement marking tape are applied, the operator generally slows the pavement marking device as the next segment of tape is advanced to synchronize the rotation of the roller with the line speed of the pavement marking tape. An operator's attempt to coordinate advancing the pavement marking tape and accelerating the pavement marking device can cause the tape to be skewed.

Motorized devices for applying self-adhesive tapes, while overcoming the difficulty associated with propelling the system up hills, can be difficult to maneuver accurately. Acceleration forces generated by the drive mechanism may stretch the pavement marking tape. For example, direct drive systems may not permit the operator to accurately control the rate of acceleration/deceleration of the marking tape applicator. The operation of centrifugal clutches depends on engine speed and therefore also reduce control of the marking tape applicator. Finally, hydraulic clutches tend to be cost prohibitive.

SUMMARY OF THE INVENTION

The present invention is directed to a self-propelled pavement marking tape applicator. A slip-clutch assembly allows the operator to accurately control power transferred from the engine to the drive wheel(s). One-way clutch bearings provide differential action to the drive wheels when negotiating turns by allowing the wheel on the outside of the turning radius to rotate at a faster rate than the wheel on the inside of the turn. The differential action provided by the one-way clutch bearings also prevent the wheels from dragging or "scrubbing" the pavement surface and permit the operator to manually push the marking tape applicator faster than it is being driven by the engine.

The self-propelled pavement marking tape applicator includes:
a frame supported by at least one roller and at least one drive wheel;
tape support means for supporting a roll of pressure sensitive adhesive tape;
tape guide means for guiding the tape toward the leading edge of at least one rollers;
a tape advance lever pivotable between an initial position near the tape guide means and an advanced position near the leading edge of at least one roller;
actuator means for moving the tape advance lever between the initial position and the advanced position;
tape gripping means attached to the tape advance lever for gripping a free end of the tape during movement from the initial position to the advanced position near the pavement surface so that the pressure sensitive adhesive on the free end of the tape is advanced into contact with the pavement surface in front of at least one roller, whereby the tape is pressed against the pavement surface by the at least one roller;
motor means for propelling the marking tape applicator engaged with the at least one drive wheel by a slip-clutch means; and
a one-way clutch bearing means interposed between the at least one drive wheel and the frame so that the marking tape applicator can be driven only in a forward direction.

In one embodiment, the at least one drive wheel comprises two drive wheels each including a one-way clutch bearing means. The one-way clutch bearing means operates as a differential gear so that one of the drive wheels can revolve faster, than the other. The slip-clutch means includes a drive belt loosely coupling the motor means with the at least one drive wheel, an idler pulley positioned to tension the drive belt, and actuating means for tensioning the idler pulley against the drive belt. The idler pulley further includes biasing means for biasing the idler pulley away from the drive belt.

DETAILED DESCRIPTION OF THE PREFERRED EMBODIMENT

Figure 1:
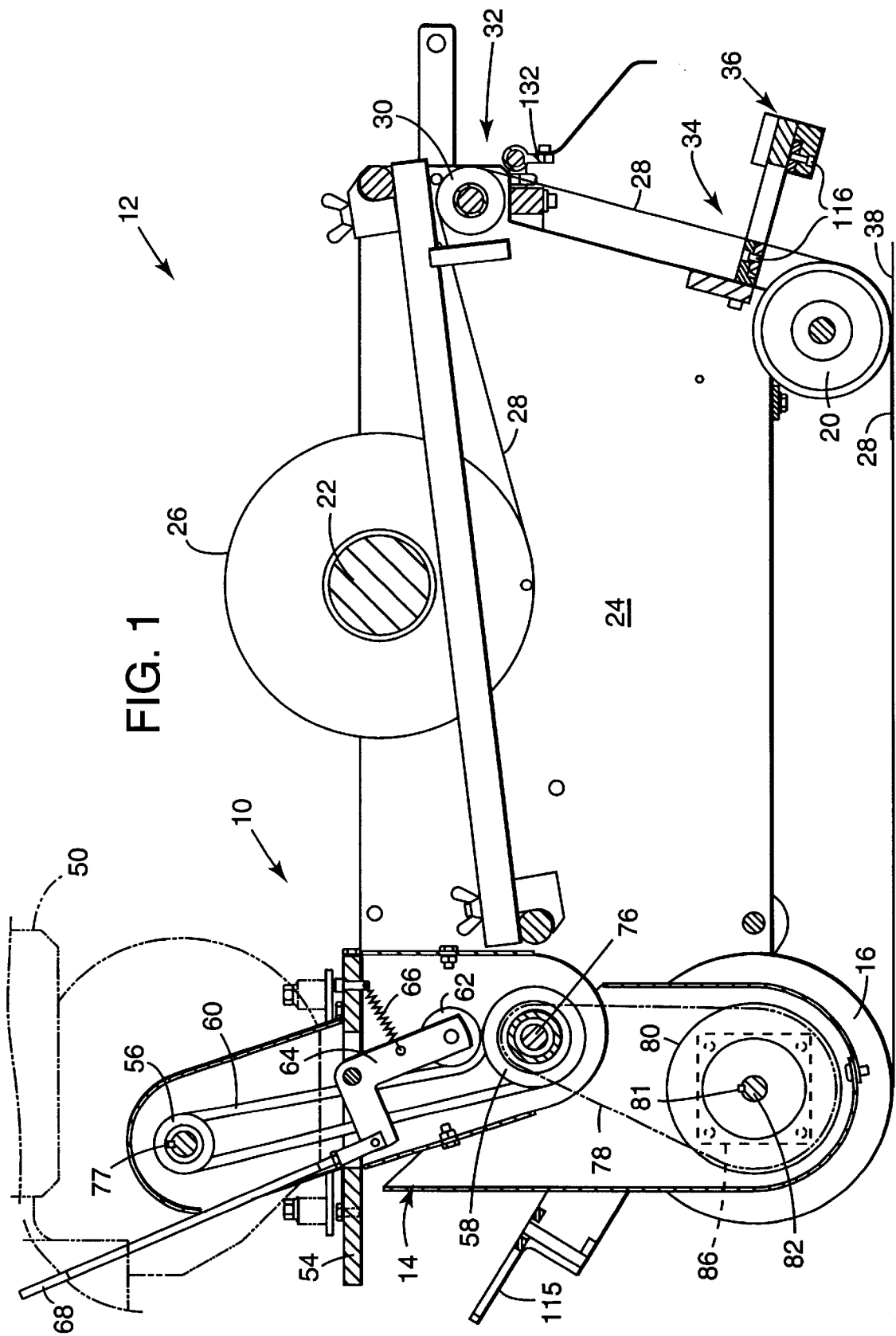
FIG. 1 is a cross-sectional view of an exemplary drive mechanism for a marking tape applicator.
Figure 2:
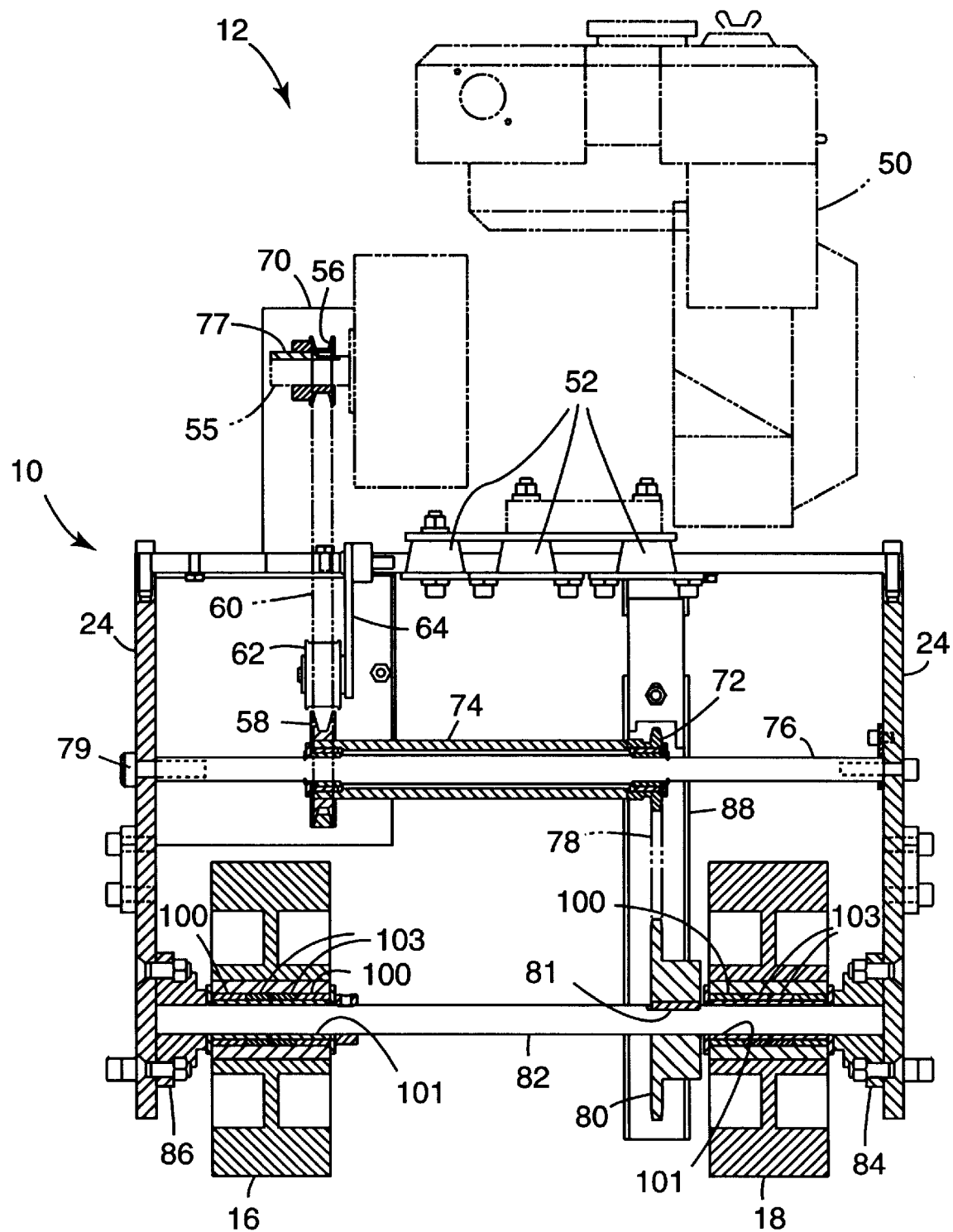
FIG. 2 is a rear view of an exemplary drive mechanism for a marking tape applicator.

FIGS. 1 and 2 illustrate a drive mechanism 10 for a marking tape applicator 12. Frame structure 14 is supported by left and right drive wheels 16, 18 and front roller 20. A tape roll shaft 22 supported by side frame members 24 supports a tape roll 26. Tape 28 is advanced around a tape guide roll 30 by a tape advance assembly 32, through an opening 34 on a cutter assembly 36 to a leading edge of the front roller 20 and the pavement surface 38. Operation of the tape advance assembly 32 and cutter assembly 36 are disclosed in U.S. Pat. No. 4,242,173 issued to Stenemann on Dec. 30, 1980, which is hereby incorporated by reference.

The drive mechanism 10 includes an engine 50 mounded via vibration mounts 52 to a motor plate 54. Vibration mounts with a 70 durometer rating suitable for use in the present invention are available from McMaster-Carr located in Chicago, Ill. under part number 64875K64. The motor plate 54 is attached to the frame structure 14 by conventional means. A 5.5 horsepower four-cycle engine, with a build-in 6:1 gear reduction, available from Honda Motor Company, is known to be suitable for the present marking tape applicator 12. It will be understood that a variety of engines may be suitable for the present application and that electric motors with a suitable power source may be substituted for the engine 50. An engine pulley 56 is connected to an engine shaft 55 by a key 77. The engine pulley 56 is loosely coupled to a power transfer pulley 58 by a drive belt 60. An idler pulley 62 coupled to the frame structure 14 by an idler arm 64 rides on the back side of the drive belt 60. A spring 66 biases the idler arm 64 away from the drive belt 60. A clutch rod 68 coupled to the idler arm 64 is provided for pivoting the idler pulley 62 toward the drive belt 60, thereby increasing the friction between the drive belt 60 and the engine and power transfer pulleys 56, 58. A belt guard 70 is provided to protect the operator from the drive belt 60.

The power transfer pulley 58 is coupled to a power transfer sprocket 72 by a power transfer shaft 74 concentrically mounted on a fixed shaft 76. A shoulder bolt 79 is provided at one end of the fixed shaft 76 to facilitate installation/replacement of the drive belt 60. A drive chain 78 couples the power transfer sprocket 72 to a drive sprocket 80 keyed 81 to a live shaft 82. The live shaft 82 turns freely in a pair of opposing axle bearings 84, 86. A chain guard 88 is provided to protect the operator from the drive chain 78. The right drive wheel 18 is retained between the drive sprocket 80 and the axle bearing 84. The left drive wheel 16 is retained between a combination collar and set screw 90 and the axle bearing 86.

An inner race 101 is press-fit onto the live axle 82 so as to eliminate the need to harden the entire axle 82. One-way clutch bearings 103 are interposed between the drive wheels 16, 18 and the inner race 101 on the live axle 82 so that the wheels 16, 18 can only be driven in the forward direction. Needle bearings 100 are also interposed between the inner race 101 and the wheels 16, 18 to provide additional support. The one-way clutch bearings 103 provide a differential action when negotiating turns by allowing the wheel 16 or 18 on the outside of the turning radius to rotate at a faster rate than the wheel 16 or 18 on the inside of the turn. The differential action provided by the one-way clutch bearings 103 prevent the wheels 16, 18 from "scrubbing" or being dragged on the pavement surface 38. The one-way clutch bearings 103 also permit the operator to manually push the marking tape applicator 12 faster than it is being driven by the engine 50, such as may be desirable when negotiating obstacles. A one-way clutch bearing, model number RC-1621 10, and an inner race, model number IR-1224, both available from The Torrington Company of Torrington, Conn., are known to be suitable for use with the present marking tape applicator 12.

Figure 3:
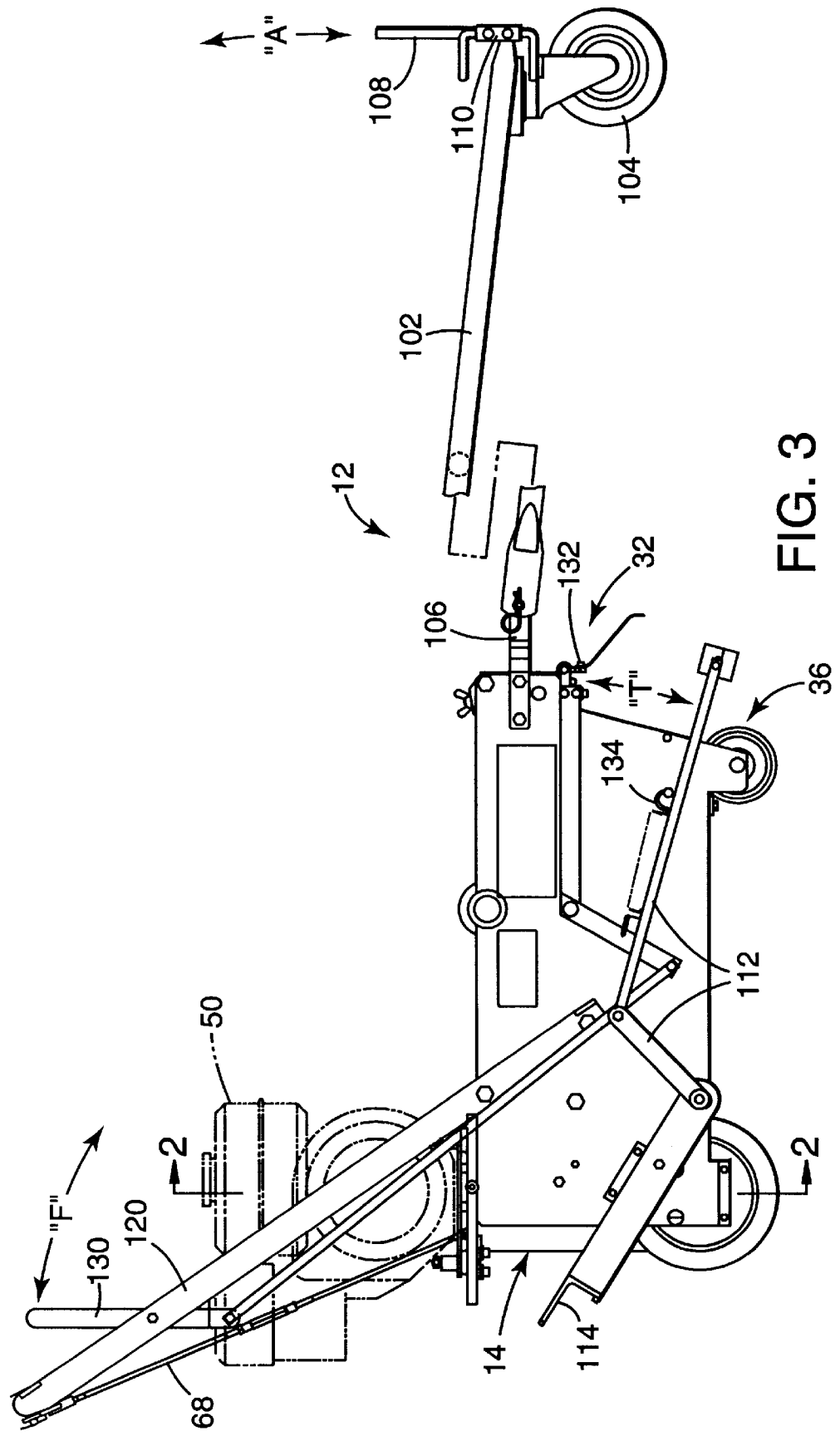
FIG. 3 is a side view of a self-propelled marking tape applicator.
Figure 4:
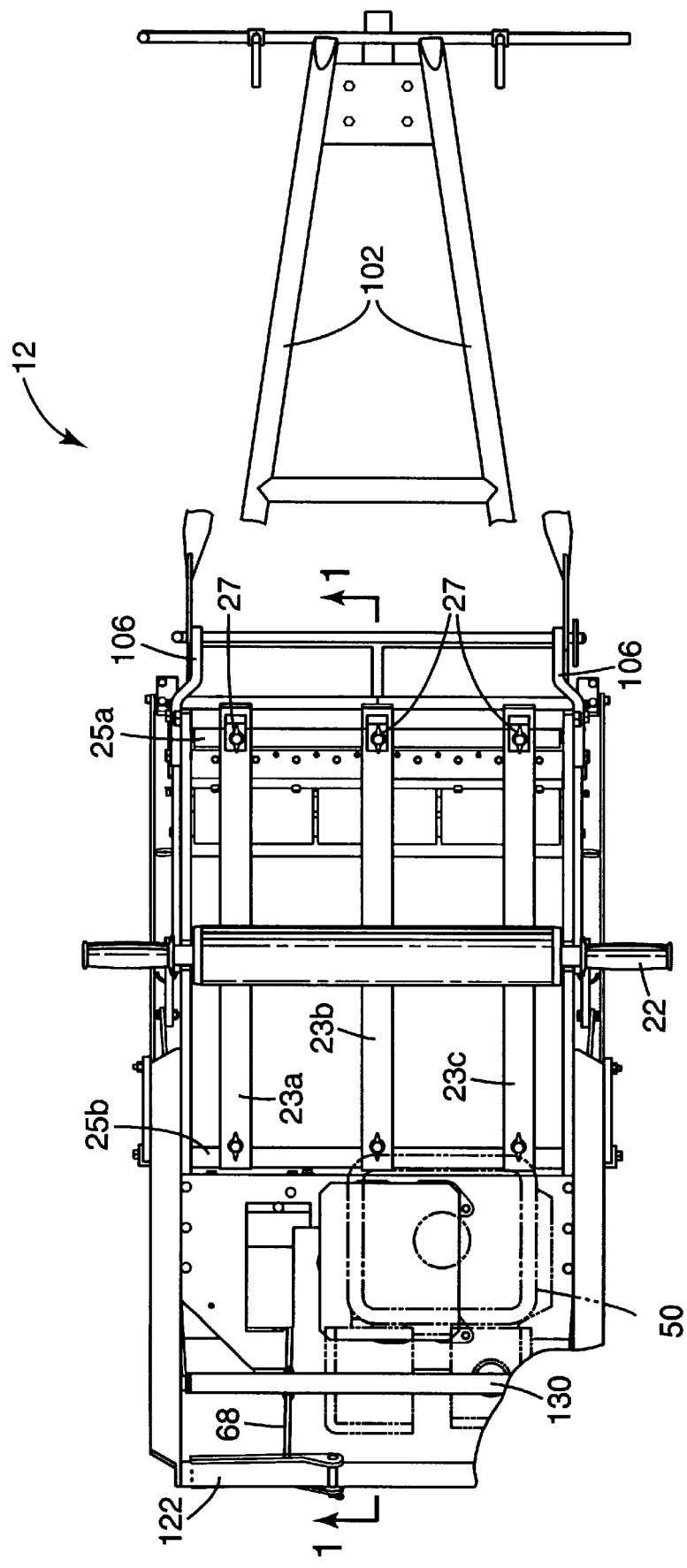
FIG. 4 is a top view of the self-propelled marking tape applicator of FIG. 3.

FIGS. 3 and 4 illustrate the overall structure of an exemplary marking tape applicator 12. A pointer frame 102 supported by a swivel caster 104 is pivotally mounted by a pointer mounting bracket 106 to the front of the frame structure 14. An adjustable pointer 108 is mounted to the front of the pointer frame 102 by a pointer clamp 110 and can be adjusted over the desired guide mark (not shown) on the pavement surface 38. The pointer frame 102 can be folded along the path "A" toward the engine 50 for storage and transport.

As best illustrated in FIG. 4, the tape roll shaft 22 is bisected by a series of cross bars 23a–c. The cross bars 23a–c are retained to a pair of side frame connecting rods 25a–b by sliding guide clamps 27. The cross bars 23a–c can be shifted laterally to maintain the lateral position of one or more tape rolls 26 within the frame structure 14.

The cutter assembly 36 includes cutter linkage 112 coupled to right cutter pedal 114 and left cutter pedals 115 (see FIG. 1). As discussed in U.S. Pat. No. 4,242,173, previously incorporated by reference, downward pressure on the cutter pedals 114 or 115 causes cutting blades 116 (see FIG. 1) to engage, severing the tape 28 in the opening 34. The cutting blades 116 preferably tilt to the left when cutter pedal 115 is depressed and to the right when the cutter pedal 114 is depressed so that one length of tape 28 may be cut without cutting the other. A full downward stroke of the cutter pedal 114 causes cutting of both lengths of tape. In the preferred embodiment, the cutter blades 116 are hardened and coated with titanium nitride to increase the useful life of the cutting edge.

The clutch rod 68 extends to the top of a handle 120, where it is coupled to a clutch lever 122. Squeezing the clutch lever 122 rotates the idler pulley 62 into the drive belt 60, thereby tensioning the drive belt 60 with the engine and power transfer pulleys 56, 58. Release of the clutch lever 122 reduces the tension on the drive belt 60 and slows the marking tape applicator 12 to negotiate obstacles, cut the pavement marking tape or other functions. The combination clutch lever 122 and idler pulley 62 permits very precise control and metering of power from the engine 50 to the drive wheels 16, 18.

Forward pressure on tape advance lever 130 along the path "F" causes pivotable gripping plate 132 (see also FIG. 1) on the tape advance assembly 32 to simultaneously grip the tape 28 against the tape advance assembly 32 and pull the tape from an initial position illustrated in FIG. 3 along the path "T" to an advanced position proximate the cutter assembly 36. The tape 28 tends to slide freely past the pivotable gripping plate 132 as the tape advance assembly 32 moves under the force of spring 134 back to the initial position. The free end of the tape 28 may be positioned just above the pavement surface 38 or may be advanced to drag on the pavement surface 38 so that the roller 20 presses the tape 28 into the pavement surface 38.

It will be understood that a variety of pavement marking tapes may be used with the present marking tape applicator 12. Examples of suitable pavement marking tapes include, by way of illustration only, Stamark brand pliant polymer pavement marking tape, model numbers 5730, 5731; Scotch-Lane brand detour grade pavement marking tape, model numbers 5710, 5711; Scotch-Lane brand construction grade pavement marking, model numbers 5160, 5161; and Scotch-Lane brand pavement marking tape, model numbers 5360, 5361. It will also be understood that the present marking tape applicator 12 may be modified to operate with pavement marking tapes having release liners covering the pressure sensitive adhesive.

Although the invention has been described with respect to specific preferred embodiments, it should be appreciated that other embodiments utilizing the concept of the present invention are possible without departing from the scope of the invention. The invention, for example, is not intended to be limited to the drive mechanisms disclosed in the preferred embodiments.

I claim:

1. A self-propelled tape applicator comprising:

(a) a frame supported by at least one roller and at least one drive wheel;

tape support means for supporting a roll of pressure sensitive adhesive tape;

(b) tape guide means for guiding tape toward a leading edge of at least one roller;

(c) tape advance means for advancing the tape to an advanced position near the leading edge of the at least one roller, whereby the tape is pressed against a pavement surface by the at least one roller;

(d) motor means engaged with the at least one drive wheel by a clutch means for propelling the marking tape applicator; and (e) one-way clutch bearing means interposed between the at least one drive wheel and the frame so that the marking tape applicator can be driven only in a forward direction, wherein the one-way clutch bearing means operates as a differential gear so that one of the drive wheels can revolve faster than the other.

2. The apparatus of claim 1 wherein the tape advance means comprises:

a tape advance assembly lever pivotable between an initial position near the tape guide means and an advanced position near the leading edge of the at least one roller;

actuator means for moving the tape advance assembly lever between the initial position and the advanced position; and tape gripping means attached to the tape advance lever for gripping a free end of the tape during movement from the initial position to the advanced position near the pavement surface so that the pressure sensitive adhesive on the free end of the tape is advanced into contact with the pavement surface in front of the at least one roller.

3. The apparatus of claim 1 wherein the at least one drive wheel comprises two drive wheels each including a one-way clutch bearing means.

4. The apparatus of claim 1 wherein the clutch means comprises a slip-clutch comprising:

a drive belt loosely coupling the motor means with the at least one drive wheel;

an idler pulley positioned to tension the drive belt; and actuating means for tensioning the idler pulley against the drive belt.

5. The apparatus of claim 4 wherein the idler pulley further includes biasing means for biasing the idler pulley away from the drive belt.

6. A self-propelled tape applicator comprising:

(a) a frame supported by at least one roller and at least one drive wheel; tape support means for supporting a roll of pressure sensitive adhesive tape;

(b) tape guide means for guiding tape toward a leading edge of at least one roller;

(c) tape advance means for advancing the tape to an advanced position near the leading edge of the at least one roller, whereby the tape is pressed against a pavement surface by the at least one roller;

(d) motor means engaged with the at least one drive wheel by a clutch means for propelling the marking tape applicator; and (e) one-way clutch bearing means interposed between the at least one drive wheel and the frame so that the marking tape applicator can be driven only in a forward direction, wherein the one-way clutch bearing means permit an operator to manually push the marking tape applicator faster than it is being driven by the motor means.

7. The apparatus of claim 6 wherein the tape advance means comprises:

(a) a tape advance assembly pivotable between an initial position near the tape guide means and an advanced position near the leading edge of the at least one roller;

(b) actuator means for moving the tape advance assembly lever between the initial position and the advanced position; and (c) tape gripping means attached to the tape advance lever for gripping a free end of the tape during movement from the initial position to the advanced position near the pavement surface so that the pressure sensitive adhesive on the free end of the tape is advanced into contact with the pavement surface in front of the at least one roller.

8. The apparatus of claim 6 wherein the at least one drive wheel comprises two drive wheels each including a one-way clutch bearing means.

9. The apparatus of claim 6 wherein the clutch means comprises a slip-clutch comprising:

(a) a drive belt loosely coupling the motor means with the at least one drive wheel;

(b) an idler pulley positioned to tension the drive belt; and (c) actuating means for tensioning the idler pulley against the drive belt.

10. The apparatus of claim 9 wherein the idler pulley further includes biasing means for biasing the idler pulley away from the drive belt.

* * * * *